No. 869,109. PATENTED OCT. 22, 1907.
J. THOMSON & E. SCHWAMBERGER.
MOTOR.
APPLICATION FILED FEB. 16, 1905.
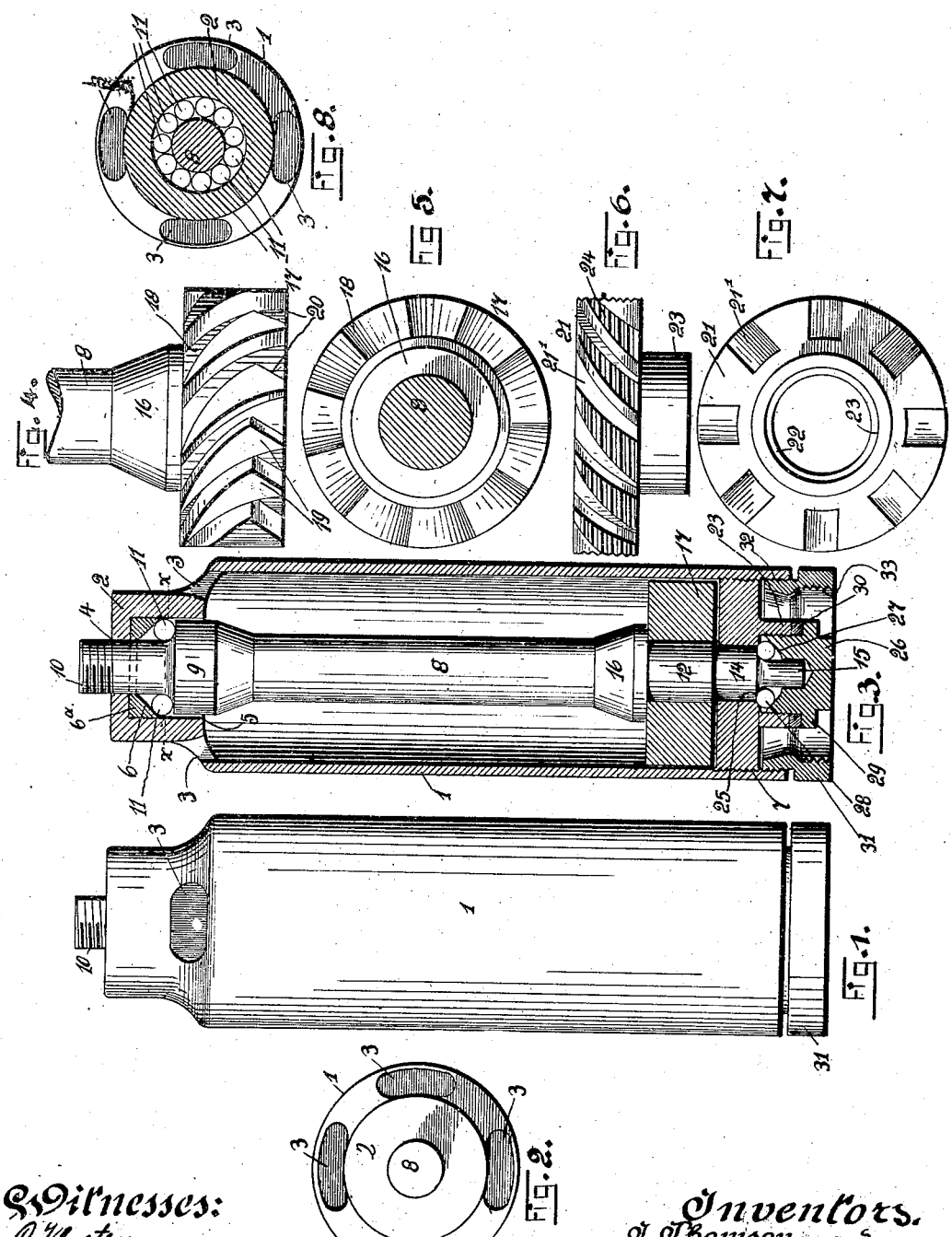

UNITED STATES PATENT OFFICE.

JAMES THOMSON AND ERNEST SCHWAMBERGER, OF PITTSBURG, PENNSYLVANIA.

MOTOR.

No. 869,109.     Specification of Letters Patent.     Patented Oct. 22, 1907.

Application filed February 16, 1905. Serial No. 245,974.

*To all whom it may concern:*

Be it known that we, JAMES THOMSON and ERNEST SCHWAMBERGER, citizens of the United States of America, residing at Pittsburg, in the county of Allegheny and State of Pennsylvania, have invented certain new and useful Improvements in Motors, of which the following is a specification, reference being had therein to the accompanying drawing.

This invention relates to certain new and useful improvements in motors, and more particularly to that type employed in connection with brushes, for cleansing flues and the like tubes.

The invention has for its object to provide a novel form of motor, which will be extremely simple in construction, strong and durable, comparatively inexpensive to manufacture and highly efficient in operation.

The invention aims to provide a motor having a ball bearing stem mounted therein, and novel means for revolving said stem, when a supply of fluid such as water is admitted to said motor. The construction employed in connection with motors heretofore used, has been extremely expensive, and the primary object of this invention is to provide a construction in connection with a motor which can be readily manufactured and used without incurring much expense.

With the above and other objects in view, the invention consists in the novel construction, combination and arrangement of parts which will be hereinafter more fully described, and then specifically pointed out in the claims, and referring to the drawing accompanying this application, like numerals of reference designate corresponding parts throughout the several views, in which:—

Figure 1 is a side elevation of a motor constructed in accordance with our invention, Fig. 2 is a top plan view thereof, Fig. 3 is a vertical sectional view thereof, Fig. 4 is a detached detailed view of the water wheel and a portion of its stem, Fig. 5 is a top plan view of the water wheel, with the stem thereof in section, Fig. 6 is a detached detailed side view of the stationary head of the motor, Fig. 7 is a bottom plan view of the same, and Fig. 8 is a transverse sectional view taken on the line *x—x* of Fig. 3.

To put our invention into practice, we employ a cylindrical casing 1, the one end of which converges to a closed tapering end 2. This end of the casing is provided with a plurality of circularly disposed slots 3, 3, which are preferably formed near the periphery of the casing 1. Centrally of the end 2, we provide an opening 4 and the material forming the end 2 is cut away to form a recess 5, in which recess we mount a washer 6ª having beveled converging sides which form a ball race 6.

The opposite end of the casing 1 is interiorly screw threaded as indicated at 7 and longitudinally disposed within said casing is a shaft 8. The one end of the shaft 8 carries a collar 9, adjacent to its screw threaded end 10, this end protruding through the opening 4 of the casing 1. The collar 9 forms a race for the ball bearings 11. The opposite end of the shaft 8 is provided with a plurality of stepped reduced portions 12, 14 and 15, the reduced portion 15 forming the extreme end of the shaft 8. The reference numeral 16 designates a tapering collar carried by the shaft 8 adjacent to the reduced portion 12.

Upon the reduced portion 12 is secured the water wheel 17 illustrated in Figs. 4 and 5 of the drawing. This wheel is provided with a plurality of peripherally curved grooves 18, said grooves when developed being substantially wedge shaped and disposed tangentially to the vertical axis of said disk. The marginal blades or vanes 19 on the body of the wheel are each cutaway at their larger ends, as indicated at 20 forming a beveled surface, which increases the size of the entrance of said grooves, the object of which will be hereinafter described.

Secured in the screw threaded end 7 of the casing 1, is a stationary head 21, said head being provided with a central opening 22 that engages over the reduced portion 14 of the shaft 8. The head 21 is provided with a depending annular interiorly screw threaded flange or collar 23. The periphery of the head 21 is provided with a plurality of curved grooves 21' formed similar to the grooves 18 of the wheel 17, with the exception that said grooves are disposed tangentially the reverse of the grooves 18 formed in the wheel 17. The periphery of the head 21 is screw threaded as indicated at 24, whereby the head can be fixed within the casing 1.

The reduced portion 14 of the shaft 8 forms one wall of a ball race 25 and in the screw threaded collar 23, we secure a cap 26 having a tapering seat 27 formed therein forming the other wall of said ball race 25, and in said race we mount a plurality of ball bearings 28. The cap 26 is provided with a peripheral flange 29 and when securing said cap within the collar 23, we preferably employ a washer 30, which is interposed between the collar 23 and the flange 29.

The reference numeral 31 designates a collar which is exteriorly screw threaded as indicated at 32 and interiorly screw threaded as indicated at 33. The collar is secured in the screw threaded end 7 of the casing 1 and serves functionally two purposes, namely, as a jam nut for the head 21 and a union for the pipe connection to be made with the motor.

The device is particularly adapted to be used in connection with a brush (not shown) that is mounted upon the screw threaded end 10 of the shaft 8, also with a suitable water supply pipe, (not shown) which is connected to the collar 31. As the water passes through the collar 31 it passes through the grooves 21' and is tangentially discharged against the wheel 17. The water encountering the grooves 18 of said wheel, causes the same to revolve, on account of the water being discharged tangentially to said wheel and encountering the beveled surfaces 20 of the blades or vanes 19 of the water wheel. The revolving of the wheel 17 causes the water to be discharged within the casing in a spiral or circuitous path, the water being finally discharged from the casing through the slots 3 formed in the contracted end of said casing. The discharged water then encounters a brush carried by the shaft 8, and as said shaft is being rapidly revolved by the passage of water through the wheel 17, the flues in which said brush is being retained will be thoroughly cleansed of any foreign ingredients that may adhere to said flues.

By mounting the shaft 8 in ball bearings, we have reduced the friction incurred by the rotation of the shaft, to a minimum, at the same time, maintaining a journal shaft which will transmit the revoluble motion imparted to it by the water wheel 17, to the brush or brushes which it carries.

While we have herein shown the preferred manner of constructing our improved motor it is obvious that various changes may be made in the details of construction without departing from the general spirit and scope of the invention.

What we claim and desire to secure by Letters Patent, is:—

A device of the class described, comprising a cylindrical casing internally threaded at one end and reduced at the other end and with a bearing in the reduced portion and with discharge ports at the juncture of the reduced portion and the body of the casing, an externally threaded annular member engaging the threaded portion of the casing, and with a plurality of angular recesses in its periphery and transversely of its threads, said annular member having a projecting annular sleeve internally threaded, a collar having means at one end for connecting to the source of power and with a threaded portion at the other end engaging the threaded portion of said casing exteriorly of said annular member and with a central shaft step externally threaded and engaging the threaded sleeve of the annular member, a shaft mounted for rotation through the bearing at the reduced end of said casing and supported in said step at the other end, and a water wheel having spaced peripheral blades and connected to said shaft adjacent to said annular member.

In testimony whereof we affix our signatures in the presence of two witnesses.

JAMES THOMSON.
ERNEST SCHWAMBERGER.

Witnesses:
H. C. EVERT,
K. H. BUTLER.